March 23, 1926.  1,578,237
H. R. REYNOLDS
SELF ALIGNING SHAFT BEARING
Filed May 13, 1924
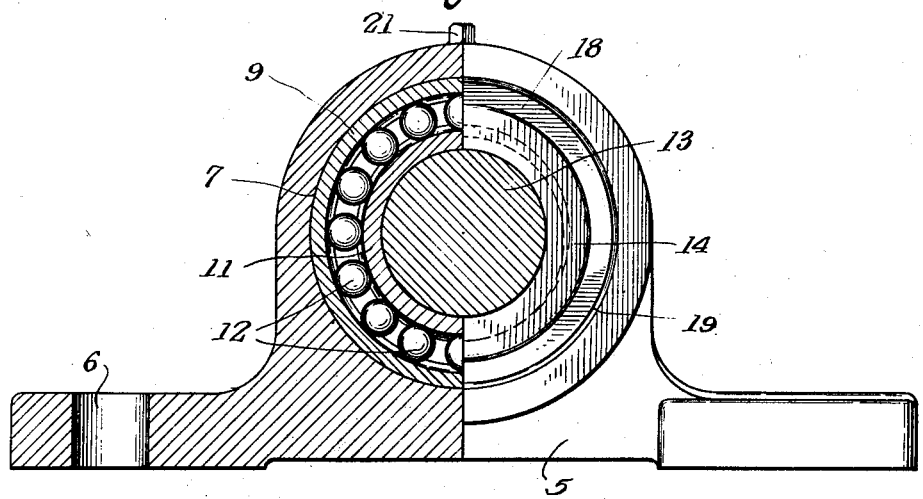
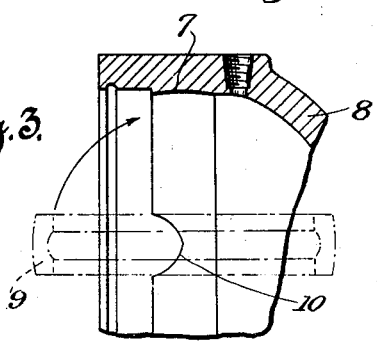
INVENTOR
Harry R Reynolds
BY
Mitchell Brothers
ATTORNEYS.

Patented Mar. 23, 1926.

1,578,237

UNITED STATES PATENT OFFICE.

HARRY R. REYNOLDS, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

SELF-ALIGNING SHAFT BEARING.

Application filed May 13, 1924. Serial No. 712,931.

*To all whom it may concern:*

Be it known that I, HARRY R. REYNOLDS, a citizen of the United States of America, residing at New Britain, Connecticut, have invented a new and useful Self-Aligning Shaft Bearing, of which the following is a specification.

My invention relates to a self-aligning shaft bearing, and particularly, though not exclusively, adapted for that class of devices known as pillow blocks, or the like.

It is the general object of my invention to improve the construction of a self-aligning shaft bearing so as to increase the life and serviceability of such a bearing.

It is a more specific object to provide a self-aligning bearing with a housing to enclose and protect the bearing elements.

It is another object to provide a self-aligning bearing with a reservoir housing for the reception and retention of a lubricant therein.

Other objects will be apparent upon a reading of the specification and an inspection of the drawings forming a part thereof.

In said drawings which show, for illustrative purposes only, a preferred form of the invention as embodied in a pillow block:

Fig. 1 is a vertical sectional view through a pillow block, illustrating features of my invention.

Fig. 2 is an end view of the pillow block shown in Fig. 1, one half being shown in section and the other half in elevation.

Fig. 3 is a fragmentary sectional view illustrating the method of assembly of parts of the structure.

In said illustrative drawings, 5 indicates the main body of a pillow block, which may be supported from any suitable beam or support, as is usual in such constructions. In the form shown the relatively wide base is provided with apertures, such as 6, for the reception of bolts for securing the pillow block in place. The main body or outer member is provided with seat means for receiving an outer bearing ring, and in the illustrative form shown the seat is formed directly on the body member. As indicated, this seat 7 is arcuate in section and is formed as part of the surface of a sphere. The outer member may be extended, as indicated at 8, so as to form housing for bearing parts to be hereinafter described.

The outer bearing ring 9 has its outer bearing surface formed as a portion of the surface of a sphere, and corresponds in size and shape to the spherical seat 7 on the outer body member. One of the members, and in the form shown the seat member 7, is cut away from a point adjacent the bottom of the seat to the outer surface, as indicated at 10, so as to permit the introduction of the outer ring 9 at right angles to the diametral plane of the seat 7, as is clearly indicated in Fig. 3. In the preferred form two opposite cutaway portions or entrance notches, such as 10, are preferably provided, in order to facilitate the introduction of the outer ring 9 into the position as indicated by dotted lines in Fig. 3. When the outer ring 9 has been thus introduced into the seat 7, the ring is rotated or orientated, as indicated by the arrow in Fig. 3, until said ring 9 occupies the position substantially as shown in Fig. 1. It will be seen that, so long as the ring 9 is maintained in engagement with the seat 7, it cannot be withdrawn and will be securely held, but it is apparent that while being firmly seated on the seat 7 slight orientation may take place under the influence of a misaligned shaft, as will be later described.

The housing 8 is preferably of a size to permit the introduction of the outer ring into the position indicated in Fig. 3, and to permit orientation into the position indicated in Fig. 1, that is to say, the housing is of a radius equal to the radius of the outer ring 9. Of course, if the aperture for the reception of the shaft is relatively large the housing may be shortened up materially, since the inner edge of the outer ring 9, when inserted as shown in Fig. 3, will then pass into the aperture or passage for the shaft.

11 indicates an inner bearing ring, while 12—12 indicate anti-friction members, such as balls interposed between the rings 9 and 11. In the preferred form the rings 9 and 11, together with the balls, constitute what is commonly known as a unit handling bearing, that is, one which is handled as a unit, and the rings are positioned and held together by means of the balls themselves. The inner ring is adapted to receive a shaft 13, which may have a locking collar 14 secured thereon, as by means of a set screw 15. The inner ring is held on the shaft and in the preferred form shown the inner ring has an eccentric outer end fitting in a correspondingly shaped recess in the collar 14 so that upon a slight relative rotation between the collar and inner ring, the latter will bind and rotate with the collar and shaft.

The housing 8 is provided with an aperture 16, slightly larger than the diameter of the shaft 13, so as to permit of a slight tilting movement of the shaft to compensate for slight misalignment of the shaft without undue engagement with the edge of the aperture 16. Suitable means, such as a felt washer 17, may be held in the aperture 16, to bear upon the shaft 13 for the purpose of excluding dust from the interior.

Closure means may be provided for the housing at the end opposite the aperture 16 and, in the form shown, a cup shaped plate having an upstanding flange 18 is held in the main body, as by means of a split ring 19 or the like. A somewhat similarly shaped ring having the upstanding flange 20 is mounted on the inner ring 11, and the two flanges 18 and 20 are spaced apart a sufficient distance to permit the slight tilting movement of the shaft above referred to. In the form shown, the locking collar 14 stands in such a position as to hold the closure 20 spaced away from the part 18 to the proper extent. The ring bearing the flange 18 should, of course, be out of the way of the outer bearing ring 9, so as to permit proper orientation thereof during the operation of the bearing. It will thus be seen that the bearing is properly housed so as to exclude dust and dirt, but the closures for the housing are such as to permit the proper orientation of the bearing on its spherical seat 7. If desired, the housing may be provided with an aperture for introduction of lubricant, and such aperture may be normally closed by a screw plug 21. If desired, the lower part of the housing may also have a drain aperture 22, normally closed by a screw plug 23.

To assemble the parts, it is only necessary to insert the outer ring, and the inner ring also when a unit handling bearing is employed, into the position shown in Fig. 3, after which the bearing is rotated in the direction of the arrow, to cause the seats on the body member and the outer ring to properly bear upon and engage each other. The shaft may then be passed through the inner ring and through the housing, and one of the members, which in the form shown is the inner ring, is secured to the shaft, while in the form shown the outer member or pillow block proper is supported in a stationary position.

Any slight misalignment between the shaft and the outer bearing member or pillow block body is taken care of by the spherical surfaces on the outer ring and the outer body member, so that slight movement or orientation may take place while still maintaining a proper and sufficient seat for the outer ring. By this expedient no undue stresses are placed upon the bearing elements, and friction will thus be reduced to a minimum, with a consequent reduction of wear and heating.

The bearing may be properly and conveniently lubricated, dust and dirt will be excluded, and lubricant will be prevented from reaching the outside of the housing.

As will be seen from the drawings, the locking collar 14 being outside of the housing makes it possible to adjust or readjust the bearing on a shaft at any time without disturbing or separating, in any way, any parts of the entire bearing assembly.

While a preferred form of the invention has been disclosed, I do not wish to be limited to the form shown, for changes may be made within the scope of the invention as defined in the appended claims.

I claim:

1. In a pillow block for shafts, a one piece main body having an integral spherical seat with an entrance notch at one side, an outer bearing ring having its outer surface formed to fit said seat, an inner bearing ring, anti-friction bearing members between said bearing rings, said spherical seat and correspondingly-shaped outer ring serving to permit orientation to compensate for misalignment of a shaft passing through said inner ring, said main body being extended at one side so as to permit the angular assembly of said outer bearing ring with said spherical seat and to provide an integral closure to loosely surround a shaft extending through the inner ring, separate means for closing said housing at the opposite side, and means extending outside of the last mentioned closing means to lock the inner bearing ring on a shaft.

2. In a pillow block for shafts, a one piece main block body having a substantially spherical seat therein, an outer bearing ring formed to fit said seat, an inner bearing ring, anti-friction bearing members between said bearing rings, said spherical seat and correspondingly-shaped outer ring serving to permit orientation to compensate for misalignment of a shaft passing through said inner ring, said main body being extended at one side so as to permit the angular assembly of said outer bearing ring with said spherical seat and to provide a housing to loosely surround a shaft extending through the inner ring, means for closing said housing at the opposite side, said inner ring projecting through said closing means, and means wholly outside of the said closing means to engage that part of the inner bearing ring extending through said closing means to lock said inner ring to said shaft, said closing means comprising two annular overlapping plates, one carried by the housing and the other carried by said inner ring.

HARRY R. REYNOLDS.